United States Patent [19]

Pearl

[11] Patent Number: 4,672,172
[45] Date of Patent: Jun. 9, 1987

[54] WORKPIECE SUPPORTING BED FOR LASER CUTTER

[75] Inventor: David R. Pearl, West Hartford, Conn.

[73] Assignee: Gerber Garment Technology, Inc., Tolland, Conn.

[21] Appl. No.: 811,026

[22] Filed: Dec. 19, 1985

[51] Int. Cl.⁴ ............................................. B23K 26/00
[52] U.S. Cl. ............................ 219/121 LG; 198/816; 198/817; 219/121 L
[58] Field of Search ................ 219/121 LG, 121 LN, 219/121 L, 121 LM; 198/817, 816

[56] References Cited

U.S. PATENT DOCUMENTS

| | | | |
|---|---|---|---|
| 245,150 | 8/1881 | Fowler | 30/275 |
| 2,759,594 | 8/1956 | Kleboe et al. | 198/817 X |
| 2,949,292 | 8/1960 | Abissi | 269/85 |
| 3,548,697 | 12/1970 | Gerber et al. | 83/422 |
| 3,612,814 | 10/1971 | Houldcroft | 219/121 LG |
| 3,640,398 | 2/1972 | Loxley et al. | 211/41 |
| 3,811,554 | 5/1974 | Egan | 198/131 |
| 3,828,159 | 8/1974 | Zoot | 219/121 LN |
| 3,828,697 | 8/1974 | Egan | 105/51 |
| 3,844,461 | 10/1974 | Robinson et al. | 346/136 |
| 3,889,095 | 6/1975 | Egan | 219/121 LY |
| 3,931,491 | 1/1976 | Stumpf | 219/121 LG |
| 3,952,861 | 4/1976 | Holmqvist et al. | 198/817 X |
| 4,039,799 | 8/1977 | Stumpf | 219/121 LG |
| 4,422,541 | 12/1983 | Lisec | 198/817 X |
| 4,438,316 | 3/1984 | Ackermann et al. | 219/121 PC |
| 4,542,820 | 9/1985 | Maxner | 198/817 |

Primary Examiner—C. L. Albritton
Attorney, Agent, or Firm—McCormick, Paulding and Huber

[57] ABSTRACT

A worksheet supporting bed for a laser cutter comprises a series of thin bands arranged parallel to one another in a common plane to form an even support surface. The bands take the form of endless strips each of which being tensioned between two braces. One of the braces is fixedly secured to an end frame portion of the bed and the other brace is secured via a tensioning screw to an opposite end frame portion. By turning the screw, the tension in the associated endless band is adjusted, and by removal of the screw, the associated endless band may be removed and another one substituted for it. The bands define elongated slots which may be penetrated by an optional mechanism which engages a worksheet supported on the bed and transports it to or from the bed. The upper edges of the bands may be smooth so that fabric sheets may slide along it easily without snagging. Also, the bed is gas-permeable.

20 Claims, 8 Drawing Figures

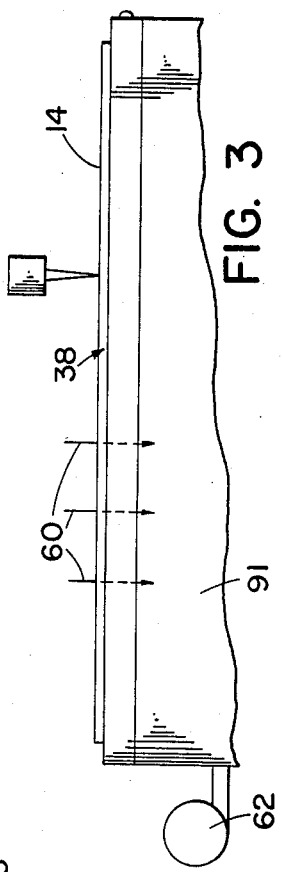
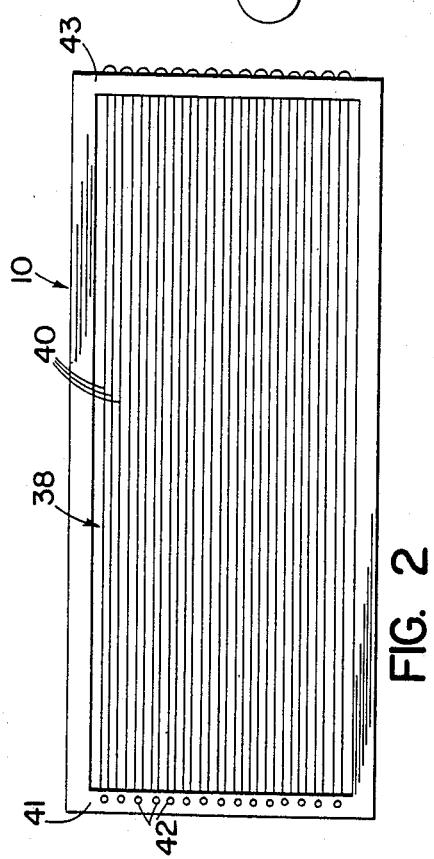
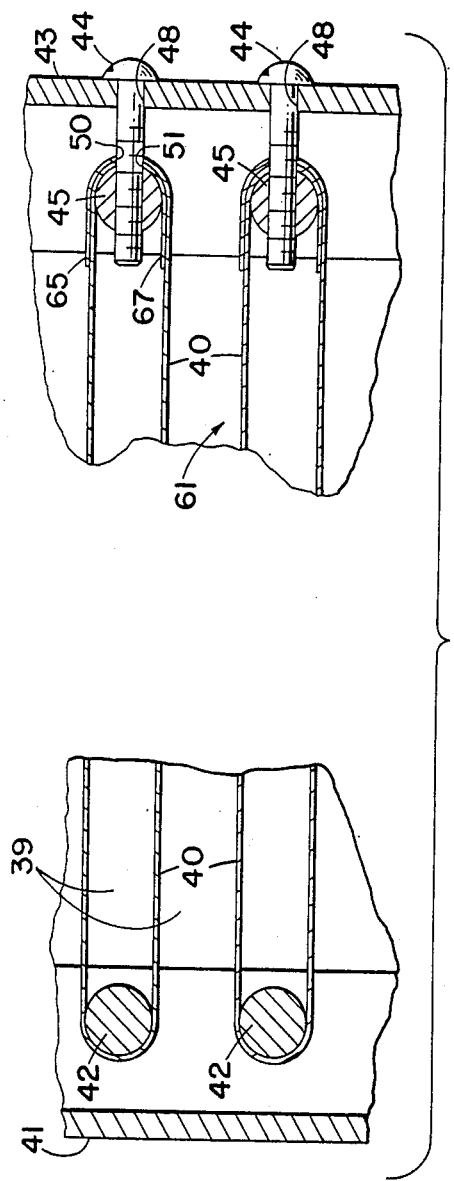

WORKPIECE SUPPORTING BED FOR LASER CUTTER

BACKGROUND OF THE INVENTION

The invention relates generally to laser cutting systems and deals more particularly with a workpiece supporting bed for a laser cutter, which bed comprises independently serviceable, worksheet supporting members. The supporting members define penetrable slots and the bed may be used with a mechanism which penetrates the slots to engage a worksheet located on the bed and transport it.

Laser cutting systems of the type with which this invention is concerned typically comprise a laser beam used for cutting cloth and other worksheets, a cutting table having a worksheet supporting bed, and a means for moving the laser beam and the support bed relative to one another. A support bed for such a system is shown in U.S. Pat. No. 3,828,159 to Zoot which bed has a complex, honeycombed or cellular surface layer. The cells are open at the top and made of a material which is darkened or roughened to trap and absorb laser light which passes through the worksheet and thereby prevent such light from reflecting back upon the worksheet and damaging it.

The cellular layer of '159 is fixed in relation to the cutting table and fresh worksheets are manually placed on the support bed for cutting, and cut pattern pieces and scrap are manually lifted off. However, in U.S. Pat. No. 3,811,554 to Egan, there is disclosed a rather complex support bed comprising honeycombed cells mounted on movable, interconnected slats to form an endless conveyor belt for automatically feeding fresh worksheets to a laser cutter and for removing cut pattern pieces and scrap.

In U.S. Pat. Nos. 4,463,639 to Gerber, 4,137,804 to Gerber and 4,112,797 to Pearl, support beds for high pressure, fluid jet cutters are disclosed, each of which beds comprises a series of parallel bars supported length-wise with their upper sides sharpened to form knife edges. The knife edges split fluid cutting jets after they pass through a worksheet to prevent back splatter. Applicant believes that such bars, even though sharpened, are not suitable to be used as a support bed for a laser cutter because they are much too thick to prevent undesirable back reflections from points adjacent the top edges. U.S. patent '639 also discloses that thin wires may be laid transversely across the knife edges of the bars if desired to provide additional support for the material on the bed.

In U.S. Pat. No. 3,978,748 to Leslie, two support beds for high pressure, fluid jet cutting apparatuses are disclosed. One of which beds comprises a grid of 0.015 inch diameter wires and the other bed comprises a series of parallel wires collectively supported and tension between rollers. No dimensions are disclosed for the parallel wires of the latter bed, but it is presumed that they have the same diameter as those of the grid, which dimension is small enough to break up a fluid jet but is too large to effectively disperse and prevent reflections of laser beams used for cutting cloth and other worksheets.

A general aim of the invention is to provide a simple worksheet supporting bed for a laser cutting system.

Another aim of the invention is to provide such a worksheet supporting bed comprising worksheet supporting members which are independently adjustable or replaceable.

Another aim of the invention is to provide a worksheet supporting bed for a laser cutter which has a surface on which cloth can easily slide without snagging.

A more specific aim of the invention is to provide a worksheet supporting bed for a laser cutter which bed may be penetrated by a mechanism which engages and transports a worksheet located on the bed.

Another specific aim of the invention is to provide a worksheet supporting bed for a laser cutter which is gas-permeable.

Other aims and advantages of the invention will become apparent from the following detailed description of the preferred embodiments and accompanying drawings.

SUMMARY OF THE INVENTION

The invention resides in a worksheet supporting bed for a laser cutter which bed comprises a series of thin bands arranged substantially parallel to one another in a common plane to form a level support surface. According to one feature of the invention, the tension in each band is independently adjustable to insure that the work surface is flat and the bands are supported in a manner which allows them to be easily replaced when necessary. According to another feature of the invention, the bands define elongated slots which are penetrable by a mechanism which engages a worksheet supported on the bed and transports it to or from the bed. The slots also allow removal of gaseous byproducts released during laser cutting. According to another feature of the invention, the bands may have smooth upper edges to allow a fabric worksheet to slide on them.

BRIEF DESCRIPTION OF THE FIGURES

FIG. 2 is a top view of the support bed of the laser cutting system of FIG. 1.

FIG. 3 is a side view of the bed of FIG. 2.

FIG. 4 is an enlarged, fragmentary top view of FIG. 1.

DETAILED DESCRIPTION OF THE PREFERRED EMBODIMENTS

Figure 1:
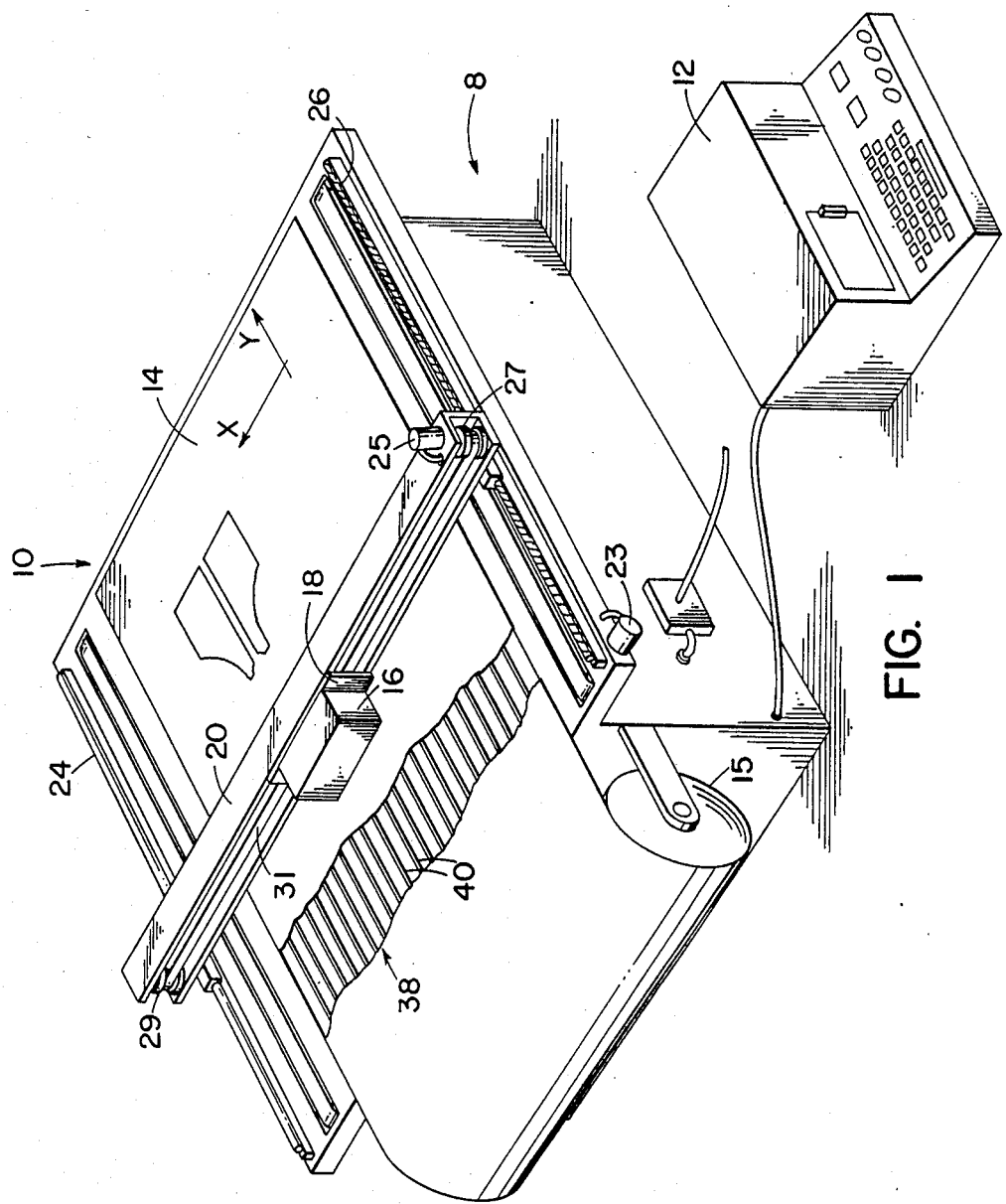
FIG. 1 is a perspective view of a laser cutting system embodying the invention and shows a worksheet broken away to reveal a support bed.

Turning now to FIG. 1, the invention is there illustrated as embodied within a laser cutting apparatus generally designated 8. The apparatus 8 includes a table 10 which supports a worksheet 14 and further includes a laser cutting head 16 which is supported above the table for movement in a plane generally parallel thereto. The head is movable in an illustrated Y-coordinate direction by a drive system including a sliding bridge 20, a lead screw 26 threadably received by the bridge, a guide bar 24 which supports an end of the bridge opposite the lead screw 26, and a stepping drive motor 23 for turning the lead screw. The head 16 is also movable in an illustrated X-coordinate direction by means of a carriage 18, a stepping drive motor 25, a timing pulley 27 driven by the motor 25, a timing pulley 29 and a timing belt 31 supported between the two pulleys, which belt is attached to the rear of the carriage 18 to drive it. Both drive motors are controlled by a controller 12 which includes a computer. For a further description of an apparatus capable of moving a head such as the laser cutting head 16 in a plane parallel to a work surface, reference may be made to U.S. Pat. No. 3,529,084 to Rich, issued Sept. 15, 1970, assigned to the assignee of the present invention and hereby incorporated by reference as part of the present disclosure.

The worksheet 14 typically comprises a sheet of cloth and is supplied from a roll 15. The cutting head 16 emits a laser beam towards the worksheet which beam, by way of example, is focussed to a 0.002 inch diameter spot on the worksheet.

Figure 5:
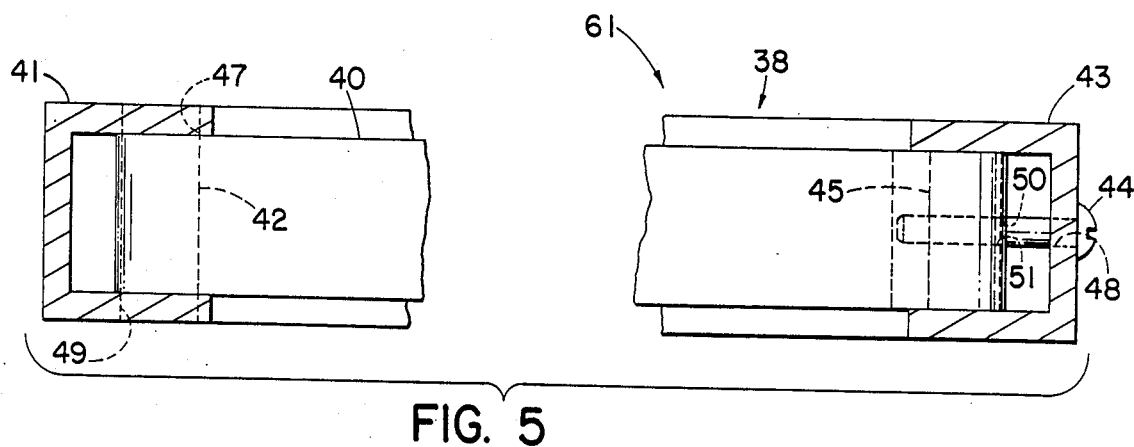
FIG. 5 is an enlarged, fragmentary side view of a band of FIG. 4.

Concentrating now on the invention as shown in FIGS. 2 and 3, the table 10 includes a bed 38 comprising a series of flexible strip bands 40,40 which are situated parallel to one another on edge with their top edges lying in a common plane to form an even support surface. The bands 40,40 are attached between opposing, trough-shaped end frame portions 41 and 43 of the table 10 and define elongated slots 39,39 which pass entirely through the bed 38. As shown more clearly in FIGS. 4 and 5, each of the bands 40 comprises a ribbon which circumscribes and is braced and tensioned between a pair of vertical pegs 42 and 45 within the end frame portions 41 and 43, respectively. The peg 42 is slidably received within vertical bores 47 and 49 in a roof and floor of the end frame portion 41 and fits snugly therein and the peg 45 is horizontally, slidably received between a roof and a floor of the end frame portion 43. A tensioning screw 44 passes through a horizontal bore 48 in a side wall of the end frame portion 43 and through apertures 50 and 51 in end portions 65 and 67 respectively of the band 40 and is threadably received by the peg 45 to fix it in place. The end portions 65 and 67 of the band 40 may be cemented or welded together and cemented to the peg 45 or attached to one another and to the peg 45 solely by the screw 44. Because of the fixed attachment of the end portion 65 to the end portion 67, the band 40 is essentially endless.

The band 40 is typically made of a flexible metal such as aluminum or steel which may stretch and sag over time, in which case, an operator may tighten the tensioning screw 44 to straighten the band. The band is darkened or roughened on its faces to absorb laser light. If a band wears out or breaks, either by excessive stretching or by laser burns, the band may be replaced with a fresh band 40. If desired, end portions 65 and 67 of the fresh band may be cemented or welded together and apertures 50 and 51 may be provided in end portions 65 and 67. To install the fresh band 40 in place of an original or worn band 40, the associated peg 42 is removed, the screw 44 removed from the associated peg 45, and the peg 45 and the original band extracted. Then, the center portion of the fresh band 40 is inserted in the end frame portion 41 outbound of the apertures 47 and 49 and the peg 42 is inserted within the apertures 47 and 49. Next, the end portions 65 and 67 together with the peg 45 are inserted adjacent the horizontal bore 48 in the end frame portion 43 and the screw 44 inserted through the bore 48 and the apertures 50,51. Then, the screw 44 is turned into the threaded bore in the peg 45 and tightened to establish the proper tension in the fresh band 40 at which tension the upper edge of the band aligns with the upper edges of the other bands to form a substantially even support surface plane.

By way of example, the bands 40,40 are one inch high and less than 0.005 inches thich, preferably 0.003 inches thick, and the diameter of the pegs 42 and 45 in ¼ inch and the spacing between centers of the pegs is ½ inch so that the spacing between parallel portions of one band and between adjacent band portions of adjacent bands 40,40 is ¼ inch. The bands 40,40 are made thin to present a minimum profile to the laser beam and thereby prevent their upward edges from reflecting laser light incident thereon; at thicknesses greater than 0.005 inches the reflections become significant. Such reflected laser light, if allowed, may burn or mark a cloth worksheet at places other than the desired lines of cut. The thinness of the bands is limited by the requirements of strength and manufacture tolerance but presumably, as material and manufacturing sciences advance, the bands will be made even thinner. The bands 40,40 may have smooth upper edges to allow fabric sheet material to slide along them without snagging.

Due to the absorption of laser light, the bands 40,40 heat to some degree, and due to the normal laser cutting of the worksheet 14, the worksheet releases gaseous and particulate by-products. To cool the bands and remove the byproducts, a partial vacuum is applied to the underside of the worksheet supporting bed 38 by means of a vacuum pump 62 coupled to a vacuum chamber 91 located beneath the bed (shown in FIG. 3). The vacuum acts directly on the worksheet 14 through the slots 39,39 and, if the worksheet is air permeable, draws out the gaseous and particulate byproducts of the laser cutting and draws fresh air, as indicated by arrows 60,60, through the worksheet and the slots 39,39 adjacent to the sides of the bands 40,40. This air also cools the bands 40,40. If the worksheet 14 is air impermeable, air is drawn around the sides of the worksheet and also cools the bands 40,40 to some degree.

The vacuum in the chamber 91 and the weight of the worksheet 14 cause narrow strip portions of the worksheet located between upper edges of adjacent bands to bow slightly downwardly. However, the spacing between the bands is small enough, ¼ inch or less, to prevent excessive bowing so that the worksheet 14 lies substantially flat on the bed 38.

Figure 6:
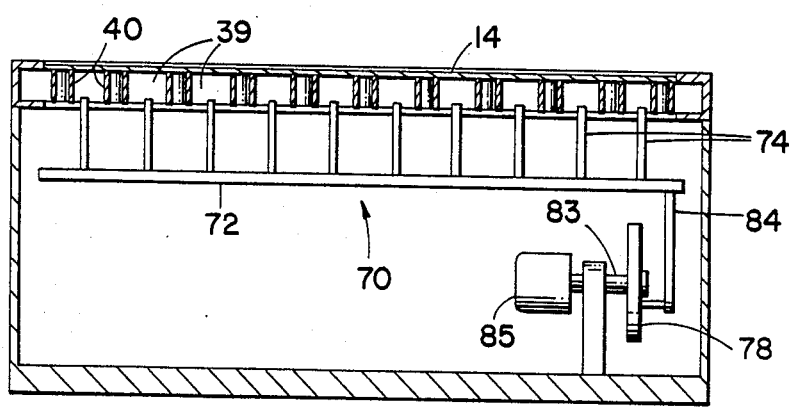
FIG. 6 is a schematic end view of the worksheet supporting bed of FIG. 2 and a worksheet transporting mechanism.
Figure 7:
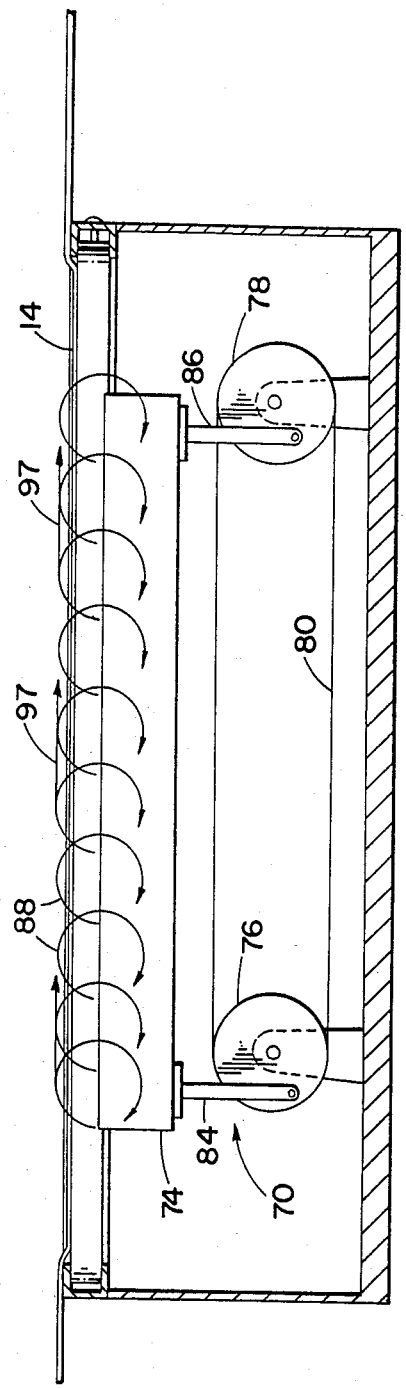
FIG. 7 is a side view of FIG. 6.

The slots 39,39 between the bands 40,40 provide access for an optional transport mechanism 70 (shown in FIGS. 6 and 7). The mechanism 70 includes a base plate 72 and vertical fins 74,74 mounted thereon, parallel to one another, edges up with the top edges lying in a common plane. The mechanism further includes a wheel 76 mounted on a support shaft 83 with its axis horizontal and transverse of the slots 39,39, a motor 85 which directly drives the wheel 76, a wheel 78 mounted with its axis parallel to and at the same vertical level as the axis of the wheel 76, a belt 80 which couples the wheel 76 to the wheel 78, and support brackets 84 and 86 pivotally mounted to faces of the wheels 76 and 78, respectively and fixedly mounted to the base plate 72. As the wheels 76 and 78 turn, the base plate 72 and fins 74,74 move in an elliptical orbit as indicated by curved arrows 88,88 and in so moving, cause the top edges of the fins to interdigitate with the bands 40,40 and penetrate the slots 39,39 and the support plane defined by the upper edges of the bands. Consequently, the fins lift and move the worksheet 14 in the Y-coordinate direction as indicated by arrows 97,97 parallel to the slots 39,39 (to the right in FIG. 7). The bands 40,40 when used in conjunction with the transport mechanism 70 have smooth top edges so that when the top edges of the fins 74,74 pass through the plane defined by the upper edges of the bands 40,40 during their orbit, the fins cause the worksheet 14, which may be made of fabric, to slide on the bands 40,40 in the Y-coordinate direction. Because of the smooth upper edges of the bands 40,40 and their generally parallel arrangement, the worksheet, even if comprised of fabric, slides easily and does not snag. Similarly, pieces which are cut from the worksheet 14 as well as scrap slide easily along the top edges of the bands 40,40.

This and other elongated, penetrating transporting mechananisms are described in detail in copending U.S. application, entitled Laser Cutting System filed same day herewith, by co-inventors David Pearl and Jacob Weiselfish and is hereby adopted by reference as part of the present disclosure.

One of the transport mechanisms described there may be integrated within the apparatus 8 and comprises a row of pins which are housed within the bridge 20 of the cutting table 10 when the transport mechanism is de-activated and are extended downwardly into engagement with the worksheet 14 when the transport mechanism is activated, through the support plane defined by the upper edges of the bans and somewhat into the slots 69,69. Then, the bridge 20 is moved in the illustrated Y-coordinate direction to transport the worksheet 14 or resultant pattern pieces and scrap. Because the pins need not pass entirely through the bed in order to grip the worksheet, the slots need not pass entirely through the bed 38, and therefore, the bands 40,40 may be further supported on a base.

Figure 8:
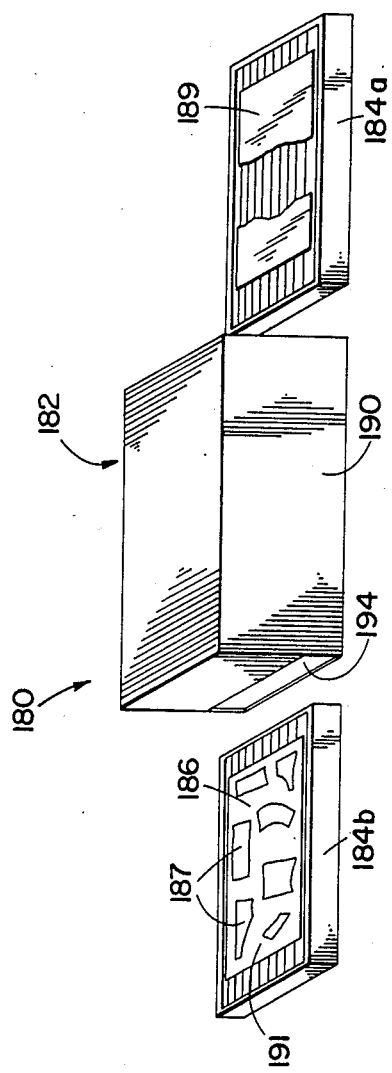
FIG. 8 is a perspective view of another laser cutting system embodying the present invention.

FIG. 8 illustrates a laser cutting system generally designated 180 embodying the present invention, which system includes a laser cutter apparatus 182 and worksheet supporting trays 184,184. Each of the trays 184,184 is substantially the same as the support bed 38. The laser cutter 182 operates in a conventional manner to move a laser beam across a worksheet to cut it into pattern pieces. By way of examples, such as laser cutter may include a laser head mounted for motion parallel to the tray 184 indicated as b loaded with a worksheet 191, or may include a fixed source of laser light or laser beam and mirrors or lenses to aim the light along desired lines of cut.

To operate the laser cutting system 180, an operator manually spreads a fresh worksheet 189 on the tray 184 indicated as a and then, manually slides the tray into a housing 190 of the laser cutter 182 through a horizontal slot (not shown). The freshly loaded tray 184a bears against the tray 184b inside the housing and forces it out the other side through a slot 194. Next, the laser cutter 182 cuts pattern pieces from the worksheet 189 similar to pattern pieces 187,187 cut previously from the worksheet 191 on the tray 184b.

While the worksheet 189 is being cut into pattern pieces by the laser, the operator removes the pattern pieces 187,187 and scrap 186 from the tray 184b, carries the tray 184b to the position previously occupied by the tray 184a, and reloads it with a fresh worksheet. After the pattern pieces are cut from the worksheet 189, the operator slides the tray 184b into the housing 190 to begin another cutting cycle.

By the foregoing, worksheet supporting beds for laser cutters have been disclosed embodying the present invention. However, numerous modifications and substitutions may be made without deviating from the scope of the invention. For example, in the system 8, the pegs 42,42 may be fixedly secured to the end frame 41 by screws which passes vertically through the end frame 41. Also, if desired, linear strip bands may be substituted for the endless bands 40,40 and fixedly secured at their one ends directly to the end frame 41 by screws or clamps and fixedly secured at their other ends to clamps which clamps are secured to the end frame 43 by tensioning screws.

It is also possible to substitute thin endless wire bands for the endless strip bands 40,40, which endless wire bands being braced between the pegs 42,42 and 45,45 in a manner similar to the manner that the strip bands 40,40 are braced between the pegs except the tensional screws are threaded directly into the pegs 45,45 and do not pass through the wire bands. Typically, such wire bands are 0.006-0.009 inches in diameter, larger in diameter than the preferred thickness of the bands 40,40 because the endless wire bands do not have the width of the strip bands 40,40 to increase their overall strength. Furthermore, linear wire bands may substitute for the endless strip bands and fixedly attach at their one ends directly to the end frame 41 and fixedly attach at their other ends to clamps which clamps attach to the end frame 43 by tensioning screws.

Therefore, the invention has been disclosed by way of illustration and not by way of limitation.

I claim:

1. A bed for supporting a workpiece for cutting by a laser cutting apparatus, said bed comprising:
    a plurality of flexible strips, and
    means for supporting said strips on edge, generally parallel to one another and aligned with one another such that edges of said strips form a substantially even workpiece supporting surface, said means for supporting said strips including means for independently adjusting tension in each of said strips.

2. A support bed as set forth in claim 1 wherein said strips define slots therebetween which slots extend at least partially into said bed.

3. A support bed as set forth in claim 2 wherein said slots pass entirely through said bed.

4. A support bed as set forth in claim 2 wherein said strips extend approximately from one end of said bed to an opposite end.

5. A support bed as set forth in claim 1 wherein each of said strips is essentially endless.

6. A support bed as set forth in claim 5 wherein said means for supporting said strips comprises braces, each of said strips being tensioned between two of said braces.

7. A support bed as set forth in claim 6 wherein said means for supporting said strips further comprises,
    a first end frame portion, and
    a second end frame portion opposite said first end frame portion, said strips being attached between said first and said second end frame portions.

8. A support bed as set forth in claim 7 wherein
    each of said essentially endless strips circumscribes one of a first plurality of said braces and one of a second plurality of said braces, and
    said means for supporting said strips comprises a plurality of screws each of which screws engages said second end frame portion and is threadably received in an associated one of said second plurality of braces.

9. A support bed as set forth in claim 8 wherein each of said screws also passes through an associated one of said strips.

10. A workpiece supporting bed as set forth in claim 1 wherein said strips are less than 0.005 inches thick.

11. A support bed as set forth in claim 10 wherein said strips are not greater than 0.003 inches thick.

12. A laser cutting system comprising:
bed means for supporting a worksheet, said bed means comprising a plurality of strips and means for supporting said strips on end, generally parallel to one another and generally aligned with one another such that corresponding edges of said strips form a substantially even worksheet supporting surface and said strips define penetrable slots which are generally parallel to one another, extend at least most of the length of said strips and extend at least partially through said bed means,
means for producing a laser beam to cut a worksheet supported on said bed, and
means for moving said laser beam relative to said bed means.

13. A laser cutting system as set forth in claim 12 further comprising means for independently adjusting tension in each of said strips.

14. A laser cutting system as set forth in claim 13 wherein said strips are length portions of endless strip bands.

15. A laser cutting system as set forth in claim 14 wherein said means for independently adjusting tension comprises braces for said endless strip bands, each of said bands being tensioned between two braces.

16. A laser cutting system as set forth in claim 12 wherein said strips of said bed means are less than 0.005 inches thick.

17. A laser cutting system as set forth in claim 12 wherein said strips of said bed means are not greater than 0.003 inches thick.

18. A process for constructing a worksheet supporting bed for a laser cutter, said process comprising the steps of:
securing one portion of a first endless strip to an end frame portion at one end of said bed,
securing an opposite portion of said first endless strip to a brace,
securing said brace to another end frame portion at the opposite side of said bed, said first endless strip being secured adjacent other endless strips, and
adjusting the tension in said first endless strip independent of said other endless strips such that said first endless strip is secured generally parallel to said other endless strips, on end, and aligned with said other endless strips such that corresponding edges of said first endless strip and said other endless strips form a substantially even worksheet supporting surface.

19. A process as set forth in claim 18 wherein the step of adjusting the tension in said first endless strip is performed by adjusting the spacing between said brace and said other end frame portion.

20. A laser cutting system comprising:
bed means for supporting a fabric worksheet, said bed means comprising a plurality of strips and means for supporting said strips on end, generally parallel to one another and generally aligned with one another such that corresponding edges of said strips form a substantially even worksheet supporting surface, said strips defining slots which are generally parallel to one another, said corresponding edges of said strips being smooth such that a fabric worksheet supported on said strips is able to slide in the direction of said strips without snagging,
means for producing a laser bean to cut a fabric worksheet supported on said bed, and
means for moving said laser beam and said bed means relative to one another.

* * * * *